United States Patent Office 3,549,581
Patented Dec. 22, 1970

3,549,581
NONAGING EPOXY COMPATIBLE
SIZING COMPOSITION
Tack J. Whang, Berea, Ohio, assignor to Ferro
Corporation, a corporation of Ohio
No Drawing. Filed June 6, 1968, Ser. No. 734,897
Int. Cl. C08g 51/42, 43/02
U.S. Cl. 260—31.4                                              13 Claims

ABSTRACT OF THE DISCLOSURE

This invention relates to certain novel nonaging epoxy compatible size compositions in which the coupling agent is a mixture of an amine-containing coupling agent and an amine-free coupling agent and in which the resin portion of the composition contains both a high molecular weight linear epoxy resin, and an epoxy Novolac resin.

BACKGROUND OF INVENTION

This invention relates to a new composition of matter and specifically to a new size composition to be applied to glass fibers employed in reinforcing resinous materials.

It is well known in the art that articles molded or formed from various plastic materials such as polyester resins, epoxy resins, phenolic resins and the like are frequently reinforced during their manufacture by combining glass strands therewith. The strands impart flexibility, strength and many other desirable characteristics to the manufactured article. However, in order to achieve the foregoing results, the molding resin and the glass strands embedded therein must achieve a highly adherent or compatible relationship. Furthermore, the integrity of the various glass strands should remain intact if the resinous material is to retain its enhanced physical properties.

In the past compatibilization and integrity of the glass strands with the molding resins have been achieved by coating the strands with a size composition having diallyl phthalate, styrene, polyvinyl acetate, or other polymer or monomer, though most frequently an epoxy or polyester resin system, as their principal component. These size compositions were not completely satisfactory, usually because they failed to render the glass strands sufficiently compatible with the various molding resins utilized commercially. In general, they also failed to give the glass strands the desired long term integrity when the strands were employed as a reinforcement, etc. with resinous materials.

A number of improved polyester and polyether based size compositions have recently been developed, for use in conjunction with polyester type molding resins which, because of their much lower cost, form the bulk of the low-cost, high-volume fiber glass reinforced plastic composite production. These compositions, however, are not suitable as sizings for glass fibers to be employed as reinforcements in composites formed with epoxy resins.

In general the size composition is applied to the glass fibers during the manufacturing operations in which the glass fibers themselves are produced. This procedure is dictated not only by the desire to avoid the necessity of maintaining a separate supply of size composition in the hands of the ultimate manufacturer who produces the reinforced plastic composite, but more importantly because the size composition can be much more uniformly and homogeneously applied during the manufacture of the fiber itself. Thus when the size composition is applied to the glass fibers during the forming operation it is possible to coat each filament as it is drawn, whereas any subsequent application of the size composition would involve applying the sizing to, at the very least, individual rovings each of which would generally be composed of from about 2,000 to 4,000 individual filaments.

Unfortunately sizing compositions, and particularly epoxy compatible sizing compositions, are known to polymerize as a function of time and also as a function of storage environment, particularly humidity and temperature. This polymerization is commonly referred to as aging, and as the degree of polymerization or aging advances, the glass roving becomes fuzzier, the rate and degree of wet-out during wet winding is reduced, and the rate and degree of wet-out during resin impregnation can be substantially reduced. In general aging of the sized glass roving results in a decrease in the physical property characteristics of the glass reinforced composite, and even in those instances where the degree of aging is not sufficient to cause a substantial decrease in tensile strength, there has usually been a very marked and substantial detrimental effect on interlaminar shear strength.

There are, of course, a number of methods of reaching some measure of the degree of the polymerization and/or aging of the sized glass composition, however, the generally accepted standard procedure is an acetone extraction test method (proposed tentative acetone extraction and ignition method for strands, yarns and roving—ASTM Comm. D-20, Sec. XVIII K.). This procedure, as will be seen in more detail hereinafter, has been employed in the evaluation of the size compositions of the present invention. Generally, a fresh roving has about 90% extractable portion of finish, and 70% extractable is, according to accepted practice in the art, generally considered as the lower limit of customer acceptance, and/or utility. The shelf life of the sized glass composition is usually referred to in the art as the period between the preparation of the fresh roving and the time at which polymerization reaches the 70% extractable level. This period of time or shelf life will, of course, vary to some extent with the conditions of storage and for this reason it has been generally accepted as good practice to store and ship the glass rovings, coated with an epoxy compatible size, under constant refrigeration in order to prolong the useful shelf life.

It has long been desired to develop an epoxy compatible sizing composition which would not age or partially polymerize during long periods of storage or shipment event under severe storage environment conditions, such as high temperature and humidity, and if possible, to develop such a non-aging epoxy compatible size, where, in addition to its non-aging properties, the size would impart to the final glass reinforced plastic composite, improved interlaminar shear and tensile strength.

SUMMARY OF INVENTION

I have now found that I can obtain improved glass reinforced plastic composites, exhibiting substantially improved interlaminar shear and tensile strength, and that a number of other important advantages can be obtained where the reinforcing fiber glass is coated with a non-aging epoxy compatible size having the following general composition:

(1) a first epoxy resin which is a high molecular weight linear epoxy polymer;
(2) a second epoxy resin which is a polyfunctional epoxy Novolac resin;
(3) a first coupling agent which is an amine-containing silane coupling agent;
(4) a second coupling agent which is a non-amine epoxy functional coupling agent;
(5) other additives well known to those skilled in the art such as solvents, lubricants, and the like.

I have found that glass fibers coated with the novel size composition of the present invention are substantially non-aging even after long periods of storage at high relative humidity and/or temperatures well above room temperature. I have also found that where such glass fibers are employed in the preparation of fiber glass reinforced plastic compositions, the cured plastic composite exhibits a marked and substantial improvement in both interlaminar shear strength and tensile strength, even in those instances where the plastic composite was prepared from sized glass fibers which had been subjected to a long period of severe storage at very high relative humidity and/or at temperatures well above room temperature.

PREFERRED EMBODIMENTS

The preferred nonaging epoxy sizing compositions of the present invention correspond to the following general solids composition:

(1) from about 10 parts to about 50 parts of a first epoxy resin which is a high molecular weight linear epoxy polymer, such as for example a high molecular weight co-polymer of Bisphenol A and epichlorohydrine;

(2) from about 50 to about 90 parts of a second epoxy resin which is an epoxy Novolac resin, such as for example those formed by the reaction of epichlorohydrine with the Novolac resin produced by the condensation reaction of phenol and formaldehyde;

(3) from about 0.5 to about 2.5 parts of a first coupling agent which is an amine containing silane coupling agent, such as for example an amino-alkyltrialkoxysilane;

(4) from about 5.0 to about 15.0 parts of a second coupling agent which is an epoxy functional non-amine coupling agent, such as for example a glycidoxy-alkyltrialkoxysilane;

(5) other additives well known to those skilled in the art such as solvents, lubricants, and the like, to produce about a 10% to 20% solution of the above solids.

In general the preferred ratio of high molecular weight Bisphenol A type epoxy resin to epoxy Novolac resin is from about 1:1 to about 1:10. The preferred ratio of amine free silane coupling agent to amine containing silane coupling agent is from about 15:1 to about 2:1. The preferred solvents of the present invention are diacetone alcohol, methyl-ethyl ketone, Cellosolve, Cellosolve acetate, methyl-isobutyl carbinol and mixtures of one or more of these materials with each other, or one or more additional aliphatic and/or aromatic hydrocarbon solvents.

The following example will serve by way of illustration and not by way of limitation to illustrate one of the novel size compositions of the present invention, and the improvements whch were obtained when it was employed as a size composition on glass fibers.

Example I

A 12.5% solids content size composition solution was prepared using diacetone alcohol as the solvent. The solids content of the solution was as follows:

| | Percent |
|---|---|
| Polyfunctional epoxy Novolac resin | 75 |
| High molecular weight linear epoxy resin | 15 |
| Amine-containing coupling agent | 1 |
| Amine-free coupling agent | 9 |

The epoxy Novolac resin was Araldite 538, a semisolid polyfunctional epoxy Novolac resin prepared by reacting epichlorohydrine with the Novolac resin produced by the condensation reaction of phenol and formaldehyde (Epoxy value, Eq./100 gm.—0.55 to 0.57). The high molecular weight linear epoxy polymer was Araldite 488, a high molecular weight linear epoxy resin prepared by reacting epichlorohydrine with bisphenol A (Epoxy value, Eq./100 gm.—about 0.30 to 0.40). The amine-containing coupling agent was Carbide A–1100 ($\gamma$-aminopropyltriethoxysilane) and the amine-free coupling agent was Corning Z–6040 (3-glycidoxypropyltrimethoxysilane). The epoxy resins and the coupling agents were dissolved in diacetone alcohol, the weight of diacetone alcohol being sufficient to produce, in conjunction with the solvents already added to the reshins by the supplier, a 12.5% solids solution. The ingredients were mechanically agitated to form the sizing solution, which was then applied to a series of glass fibers, under essentially normal production conditions, at conventional forming speeds, etc. The solution was applied by means of a roller type applicator, of the type disclosed by United States Pat. 2,742,737, to alumina-magnesium-silicate glass fibers, formed by a method similar to that disclosed in United States Pat. 2,482,071. The sized glass fibers (1 to 2% by weight sizing) were collected into a 204 filament strand which was wet wound on a collet, according to conventional procedures well known to those skilled in the art, and the wound glass fibers were then subjected to a heat treatment at 245° F. for a period of from 10 to 20 hours, to partially cure the size composition. Twenty of the heat treated strands were then combined to form the sized 20-end roving, again using standard production procedures and techniques well known to those skilled in the art.

Example II

A second batch of experimental 20-end roving was produced in a manner similar to that described in Example I substituting a 12.5% solids content solution of the following size composition for that used in Example I:

| | Percent |
|---|---|
| Epon 834 epoxy | 90 |
| Carbide A–1100 | 1 |
| Corning Z–6040 | 9 |

Epon 834 is a linear epoxy resin having a molecular weight of about 470, of the type produced by reacting epichlorohydrine and bisphenol A (epoxy value, grams of resin containing one gram equivalent of epoxide—230–280; esterification value 105).

The rovings produced in Examples I and II were subjected to a series of comparative physical and environmental testing procedures, in order to evaluate the utility of the size composition, its degree of non-aging characteristics, and the effect, if any, of the size composition on the physical properties of the roving, and/or epoxy composites in which the roving was employed as a reinforcement. Examples III and IV describe in more detail, various tests to which the roving of Example I was subjected and the surprising improvement exhibited by this roving as compared with similar roving coated with various known sizing compositions of the type heretofore employed.

Example III

*Determination of extractables.*—A series of tests were conducted to determine the percentage of extractables in the roving produced according to Example I, following the procedure of the Proposed Tentative Acetone Extraction and Ignition Method for Strands, Yarns and Roving—ASTM Comm. D–20, Sec. XVIII K. Test samples were prepared by cutting off a two-yard length of the 20-end roving which was then wound in a two-inch circle, self tied in the middle, and weighted. The test sample was placed in a 125 ml. flask and a first extraction was made by adding 50 ml. of cold acetone and agitating the flask for five minutes, after which the acetone was drained off. A second and third extraction were then made in the same manner, using in each case 50 ml. of cold acetone. After the third extraction, the test sample was removed from the flask, dried at 140° F. for thirty minutes, cooled in a dessicator and weighted. The sample was then placed in a crucible and fired in a muffle furnace at about 1150° F. for about 20 minutes to determine the original weight of the size composition (original weight of the sample— the weight after ignition). The percentage of extractables was then calculated from the formula:

Percent extractable:

$$\frac{\text{Original weight of sample} - \text{Weight after extractions}}{\text{Original weight of sample} - \text{Weight after ignition}} \times 100$$

as a function of the original weight of the sample. A similar series of extraction tests were conducted on the roving of Example II, and also one one of the more widely accepted commercial aluminum-magnesium-silicate type glass fiber rovings, sized with an epoxy compatible size composition.

As noted hereinbefore, the accepted criteria for evaluating the degree of aging of sized glass fiber roving, and therefore the non-aging characteristics of the size composition, is by determining the percentage of extractables after a given period of time in a given environment. In essence, this testing measures the percentage of unpolymerized size, since the fully polymerized portion of the size composition will not be dissolved by the acetone. The aging characteristics of the novel size composition of Example I were tested as described in Example IV.

Example IV

*Aging tests.*—A series of accelerated shelf life tests were conducted on the roving of Example I, the roving of Example II, and equivalent commercial roving coated with an epoxy compatible size. The tests were conducted by subjecting a series of samples to an environment in which the temperature was maintained at 110° F. and the relative humidity at 100%. At least 3 samples of each roving were removed after predetermined periods (after 1, 3, 5, 8, 11, 22 and 27 days, then every 7 days until failure) and the percentage of extractables for each sample was measured according to the procedure of Example III. A record was kept of the number of days of storage under these conditions for each of the rovings, and failure was recorded when the percentage of extractables (averaging all samples of that roving) dropped to below 70%. The results of these accelerated tests, and the approximate room temperature shelf life for the various test samples are contained in Table I. The room temperature shelf life figures are 6 times the observed accelerated aging figure. This factor is based on long term experience in the correlation of such figures, and the approximated shelf life of the commercial roving, as listed in Table I, was subsequently found to be entirely consistent with that reported by others in the field.

of specific test procedures, however, in general the procedures differ only as to the details of the procedure followed, and they all seek to measure the force required to cause a separation at the interface, usually by measurement of the interlaminar shear strength. The roving of Example I and the commercial roving were subjected to interlaminar shear strength testing following the procedure prescribed by ASTM-D-2344-67 Ring Segment Beam Shear Test for a measurement of horizontal shear strengths. The test samples for the shear testing were prepared by winding the fiberglass according to the ASTM test specification, and using the wound glass fibers as reinforcement in the molding of a test ring from an epoxy resin composition. The epoxy resin composition consisted of 100 parts of carbide epoxy resin ERLA-2256 bis(2,3-epoxycyclopentyl) ether and 34.0 parts of m-phenylenediamine. The results of these tests are set forth in Table II.

TABLE II

| | Dry test | | After 2 hrs. in boiling $H_2O$ | |
|---|---|---|---|---|
| | Number of test samples | Average strength in p.s.i. | Number of test samples | Average strength in p.s.i. |
| Roving: | | | | |
| Example 1 | 20 | 15,410 | 10 | 15,250 |
| Commercial | 20 | 14,230 | 10 | 13,970 |

From the data of Table II it will be immediately apparent that the roving of Example I not only has better shear strength characteristics than the commercially available materials in dry testing, but in addition retains these characteristics to a greater extent in those samples which were boiled in water for two hours.

A large number of additional compositions within the scope of the present invention, as broadly defined hereinbefore, were prepared and applied to glass fibers drawn from a wide variety of glass compositions. These additional size compositions contained as much as 50% high molecular weight linear epoxy polymer in one case, and as much as 80% of an epoxy Novolac resin in another case. Similarly, the ratio of amine to non-amine containing coupling agent was varied from about 2:1 to about 15:1 and a number of other high molecular weight linear epoxy polymers and/or epoxy Novolac type polymers were substituted for those employed in Example I. As examples of high molecular weight linear epoxy polymers which could be substituted for the Araldite 488 used in Example I, mention may be made of Shell Eponol 53

TABLE I

| Roving | Shelf life at 100° F. and 100% R.H. | Approximate shelf life at room temperature | Rate of decrease in percent of extractables | |
|---|---|---|---|---|
| | | | At start | Thereafter |
| Roving of Example I | 230 days | 1,380 days | 0.5%/day for 4 days | 0.06%/day. |
| Commercial Roving | 4 days | 24 days | 5.0%/day for 12 days | 0.25%/day. |
| Roving of Example II | 60 days | 360 days | 2.0%/day for 4 days | Do. |

The superiority of the aging characteristics of the size composition of Example I in comparison with those of the commercial epoxy compatible size composition are obviously most outstanding and very surprising. In the evaluation of aging properties it will, of course, be appreciated that the most important figures are those which relate to the rate of decrease in the percentage of extractables and in this respect the size composition of Example I is particularly outstanding.

One of the main functions of the size composition is to promote bonding at the interface of the glass fibers and the resin where the fibers are being employed as a reinforcement. The efficiency of a particular size composition in this regard can be measured by a member and Shell Eponol 55. As examples of epoxy Novolac resins which can be substituted for the Araldite 538 of Example I, mention may be made of Araldite 539, Shell Epon 152 and Shell Epon 154. In each case a series of test evaluations were made, and in every instance it was determined that these compositions were superior to those heretofore available, and in every case the size composition was evaluated as being non-aging and epoxy compatible and was found to impart improved interlaminar shear strength to epoxy composites in which it was introduced as a reinforcement.

While suitable size compositions have been produced from a wide variety of ratios of epoxy resins and/or coupling agents, the best results appear to be exhibited by those compositions wherein the solids portion consists essentially of:

(a) from about 10 parts to about 20 parts of the first epoxy resin;
(b) from about 70 to about 80 parts of the second epoxy resin;
(c) from about 0.5 to about 1.5 parts of the first coupling agent;
(d) from about 8.5 to about 9.5 parts of the second coupling agent, and wherein the first coupling agent and the second coupling agent together comprise from about 85% to about 95% by weight of the said solids portion.

It will, of course, be obvious that a wide number of modifications, changes and substitutions can be made in the foregoing procedures and compositions without departing from the scope of the invention herein disclosed and it is my intention to be limited only by the appended claims.

As my invention I claim:

1. A nonaging epoxy compatible size composition consisting of from about 5% to about 25% by weight of a solids portion and from about 75% to about 95% by weight solvent, said solids portion consisting essentially of:
  (a) a first epoxy resin which is a high molecular weight linear epoxy polymer in from about 10 parts to about 50 parts by weight;
  (b) a second epoxy resin which is a polyfunctional epoxy Novolac resin in from about 50 to 90 parts by weight;
  (c) a first coupling agent which is an amino-alkyl-trialkoxysilane coupling agent in from about 0.5 to about 2.5 parts by weight;
  (d) a second coupling agent which is a glycidoxy-alkyl-trialkoxysilane coupling agent in from about 5.0 to about 15.0 parts by weight.

2. The composition according to claim 1 wherein said solids portion consists essentially of:
  (a) from about 10 parts to about 20 parts of said first epoxy resin;
  (b) from about 70 to about 80 parts of said second epoxy resin;
  (c) from about 0.5 to about 1.5 parts of said first coupling agent;
  (d) from about 8.5 to about 9.5 parts of said second coupling agent,
and wherein said first coupling agent and said second coupling agent together comprise from about 85% to about 95% by weight of the said solids portion.

3. The composition according to claim 1 wherein said first epoxy resin is a high molecular weight linear epoxy polymer produced by reacting epichlorohydrine with a bisphenol.

4. The composition according to claim 1 wherein said second epoxy resin is a polyfunctional epoxy Novolac resin.

5. The composition according to claim 1 wherein:
  (a) said first epoxy resin is a high molecular weight linear epoxy polymer produced by reacting epichlorohydrine with a bisphenol and,
  (b) said second epoxy resin is an epoxy Novolac resin.

6. The composition according to claim 2 wherein said first epoxy resin is a high molecular weight linear epoxy polymer produced by reacting epichlorohydrine with a bisphenol.

7. The composition according to claim 2 wherein said second epoxy resin is a polyfunctional epoxy Novolac resin.

8. The composition according to claim 2 wherein:
  (a) said first epoxy resin is a high molecular weight linear epoxy polymer produced by reacting epichlorohydrine with a bisphenol and,
  (b) said second epoxy resin is an epoxy Novolac resin.

9. The composition according to claim 7 wherein said epoxy Novolac resin is formed by the reaction of epichlorohydrine with the Novolac resin produced by the condensation reaction of phenol and formaldehyde.

10. The composition according to claim 8 wherein said epoxy Novolac resin is formed by the reaction of epichlorohydrine with the Novolac resin produced by the condensation reaction of phenol and formaldehyde.

11. The composition according to claim 8 wherein said first coupling agent is γ-amino-propyltrialkoxysilane.

12. The composition according to claim 8 wherein said second coupling agent is 3-glycidoxy propyltri-methoxysilane.

13. The composition according to claim 11 wherein said second coupling agent is 3-glycidoxy propyltri-methoxysilane.

References Cited

UNITED STATES PATENTS

| | | | |
|---|---|---|---|
| 3,051,681 | 8/1962 | Partansky | 260—830(TW)X |
| 3,269,974 | 8/1966 | Childs | 260—830(TW)X |
| 3,459,585 | 8/1969 | Killmeyer et al. | 117—126(GEP)X |

OTHER REFERENCES

Sterman et al.: Silane Coupling Agents as Integral Blends in Resin-Filler Systems, "Modern Plastics," July 1963, pages 125, 127, 129, 130, 134, 136, 138, 177.

MORRIS LIEBMAN, Primary Examiner

L. T. JACOBS, Assistant Examiner

U.S. Cl. X.R.

260—830, 32.8, 33.4